(No Model.)
W. B. GUILD.
BALANCE WEIGHING SCALE.
No. 326,975. Patented Sept. 29, 1885.
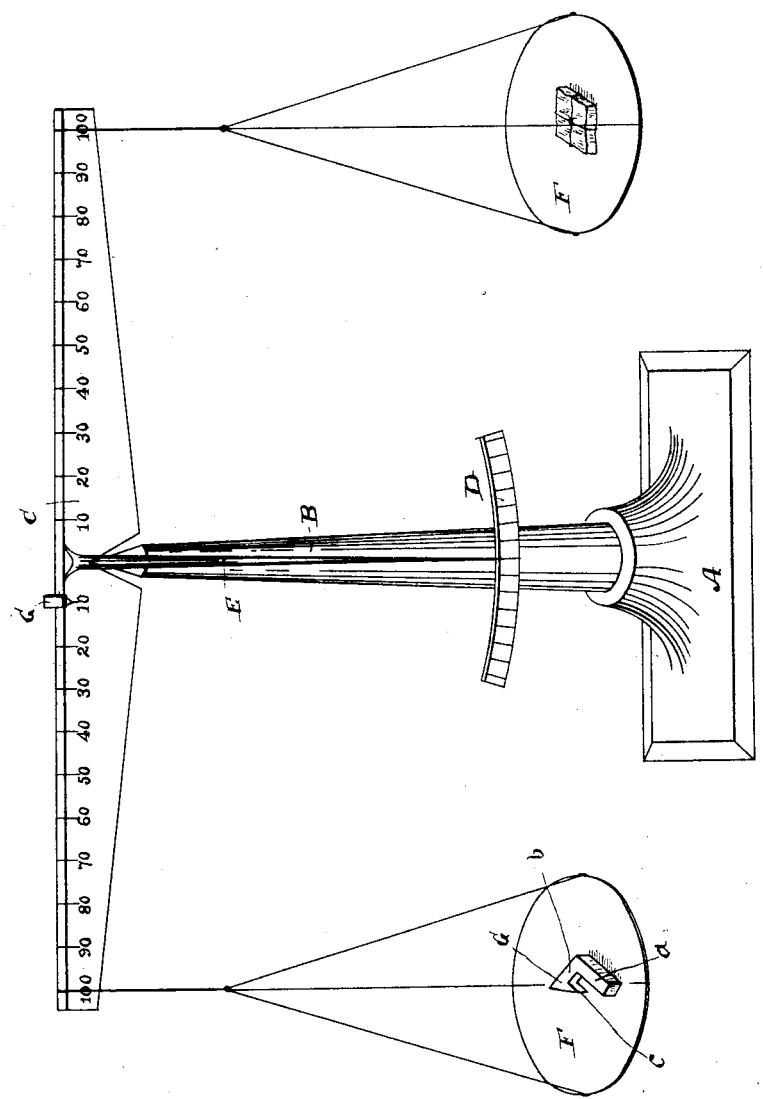
WITNESSES
C. S. Bell
Oscar Nauck
INVENTOR
Walter B. Guild.
By Paine & Ladd, Attorneys

UNITED STATES PATENT OFFICE.

WALTER B. GUILD, OF BOSTON, MASSACHUSETTS.

BALANCE WEIGHING-SCALE.

SPECIFICATION forming part of Letters Patent No. 326,975, dated September 29, 1885.

Application filed October 9, 1884. (No model.)

*To all whom it may concern:*

Be it known that I, WALTER B. GUILD, a citizen of the United States, residing at Boston, in the county of Suffolk and State of Massachusetts, have invented certain new and useful Improvements in Balance Weighing-Scales; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention is an improved balance weighing-scale of such construction as to enable weights or poises to be adjusted on the beam, and the beam so graduated that a given weight can be arranged either in the pan or upon the beam immediately above the point of suspension of said pan to exert in either position its maximum leverage upon said beam, or moved along said beam toward the fulcrum thereof, to indicate any of the fractions or subdivisions of the given weight it represents.

In the accompanying drawing I have illustrated in elevation a balance weighing-scale embodying my improvements.

On a suitable base, A, is mounted a standard, B, the upper terminal of which is reduced to present a knife-edge or fulcrum for the central portion of the horizontal beam C.

A graduated arc, D, is located on and secured to the lower portion of the standard B. An index-arm, E, is vertically suspended from the central portion of the beam C, to oscillate therewith and indicate on the arc D any weight imposed upon the beam C at either side of the fulcrum in excess of a true balance. Each or either half of the beam C is graduated in the direction of its free end to present a series of divisions and subdivisions, ranging, for instance, from ten up to one hundred, the highest number of each series of divisions being located at each end portion of the beam. A scale-pan, F, is suspended from each end of the beam C in vertical line with the extreme divisions of each series of graduations.

The form and arrangements of weights or poises is preferably like that of the weight or poise G, consisting of a body, $a$, and arm $b$, located at right angles thereto, and terminating at its end in an index lip or finger, $c$, the adjacent parallel faces of the index $c$ and body $a$ being sufficiently separated to enable the said weight to be placed upon and embrace the upper edge of the beam, the lip or finger being adapted to depend down in front of the graduated face of the beam and register with the graduations on the same. From the foregoing it will be apparent that when a poise of a given weight is moved along one side of the beam C, so as to register with the extreme division thereon, it will exert a leverage on the beam equal to what it would if it were placed in the scale-pan below.

The advantage of this construction will be obvious. Referring to the figure, for instance. it will be seen that if a one-grain poise were placed in the scale-pan and a second one-grain poise located on the beam, a quantity could be weighed in the other pan equal to one (1) whole grain, and any of the various fractions of a grain up to one hundred, or an amount equal to two grains will be weighed by moving the weight on the beam to register with the extreme division thereon. It will therefore be apparent that quantities can be weighed to amounts and fractional amounts, and with accuracy and precision in fractional amounts closely approximating the complete amount represented by the particular poise employed. The movement of the index-arm E to either side of the central division on the arc D will indicate a lack of equipoise of the two scale-pans, or of leverage on either side of the beam-fulcrum.

I claim—

1. The combination, in a weighing-scale, of a beam centrally pivoted, and a scale-pan suspended from near or at each end of the beam, a series of graduations being formed on said beam from the fulcrum toward each or either end of the same, and ceasing at a point immediately above the point of suspension of the adjacent scale-pan, and poises or weights adapted to be used as described, substantially as set forth.

2. The combination, in a weighing-scale, of a beam, a pan or receptacle suspended at or near the end of said beam, which is provided with a series of graduations extending to a point above that from which said scale-pan is suspended, and a depending index-arm, E, and arc D, substantially as set forth.

In testimony whereof I affix my signature in presence of two witnesses.

WALTER B. GUILD.

Witnesses:
W. C. CODMAN,
GEO. W. KUHN.